United States Patent

[11] 3,596,523

[72] Inventor Richard B. Clark
       Granada Hills, Calif.
[21] Appl. No. 687,563
[22] Filed Dec. 4, 1967
[45] Patented Aug. 3, 1971
[73] Assignee Whittaker Corporation
       Los Angeles, Calif.

[54] FULL-FREEDOM GIMBALLESS GYROSCOPE SYSTEM
30 Claims, 17 Drawing Figs.

[52] U.S. Cl. .................................................. 74/5.6,
                                                 74/5, 74/5.7
[51] Int. Cl. ................................................. G01c 19/28
[50] Field of Search ..................................... 74/5, 5.1,
                                  5.12, 5.14, 5.22, 5.34, 5.37, 5.4—5.6, 5.7

[56] References Cited
UNITED STATES PATENTS
3,199,932 8/1965 Clark ............................ 74/5 X
3,262,324 7/1966 Taylor .......................... 74/5

Primary Examiner—Verlin R. Pendegrass
Attorney—Donald E. Nist

ABSTRACT: A gyroscope system having a gyro rotor completely enclosed within a spherical float that is supported within a hollow spherical cavity by a flotation fluid and a spherical arrangement of hydrostatic bearing pads. The gyroscope rotor is mounted on a spin axle by a duplex bearing arrangement to be spun by a motor also within the float. A set of orthogonally arranges sensing coils are mounted within the spherical cavity to surround the float. Flux emanating from magnetic pole pieces carried on the rotor cut the coil windings to generate output signals, the relative amplitude and phasing of which is indicative of the angular displacement of the rotor spin axis from each of the coil axes. A caging mechanism maintains the float in an initial position and may be used to supply power from an external source to accelerate the spin motor. After uncaging, spin motor power is supplied either from batteries carried within the float or from an external source which supplies power through a capacitive or conductive coupling between the conductive surface of the hydrostatic bearing pads and adjacent circular conductive segments at either end of the float.

PATENTED AUG 3 1971
3,596,523
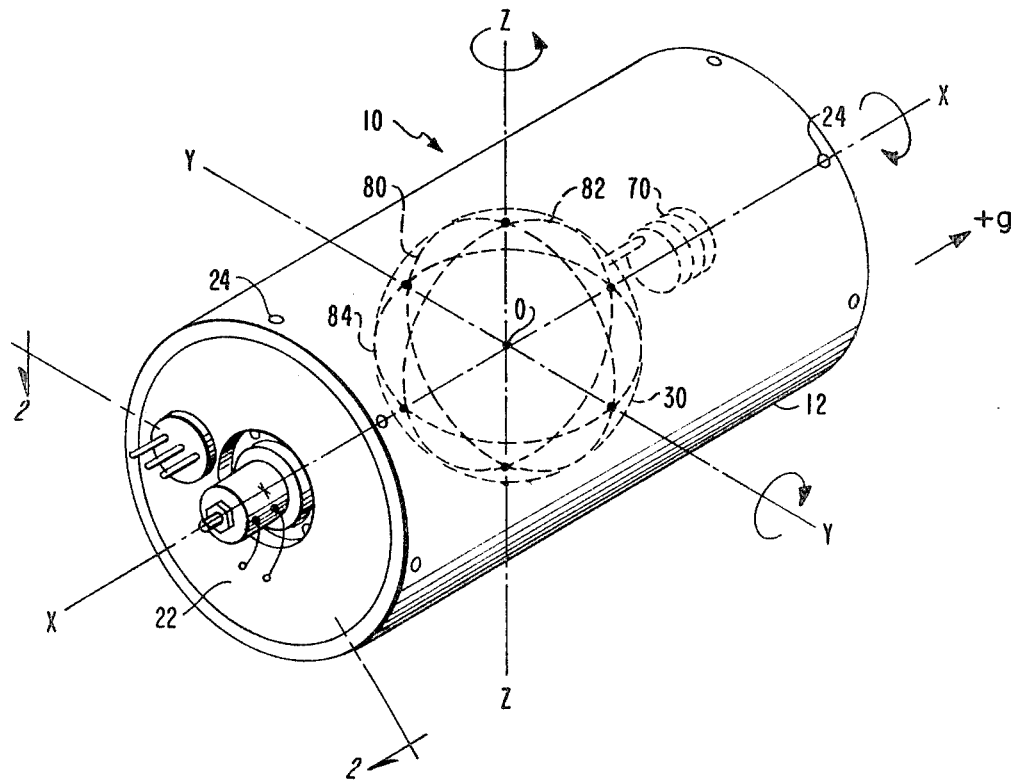
FIG.—1
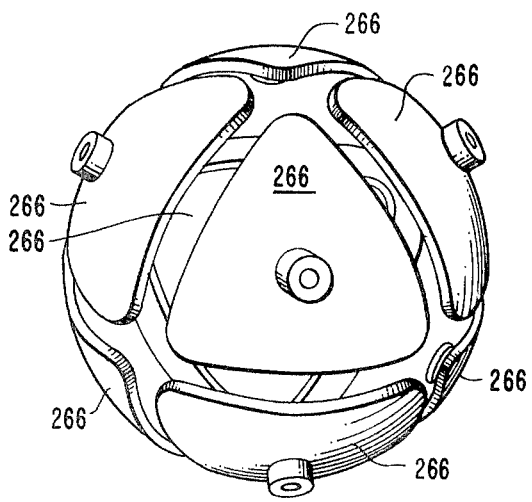
FIG.—4
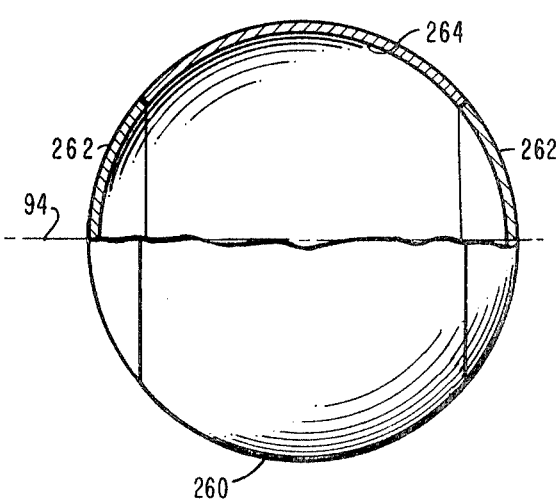
FIG.—12
INVENTOR.
RICHARD B. CLARK
BY
*Fraser & Bogucki*
ATTORNEYS INVENTOR.
RICHARD B. CLARK
BY
Fraser & Bogucki
ATTORNEYS INVENTOR.
RICHARD B. CLARK
BY
Fraser & Bogucki
ATTORNEYS

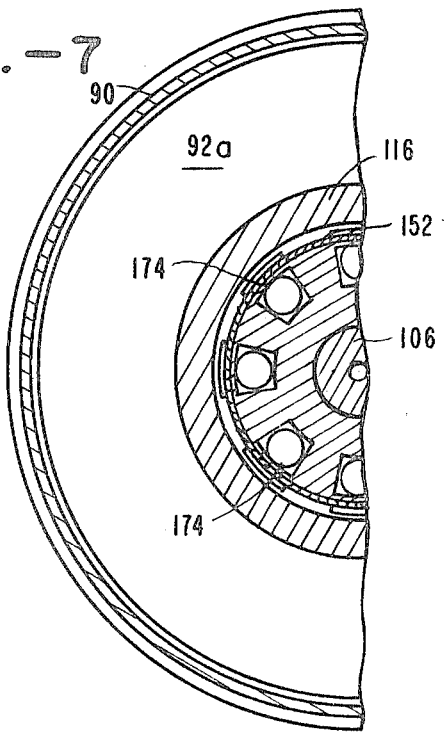
FIG.-7
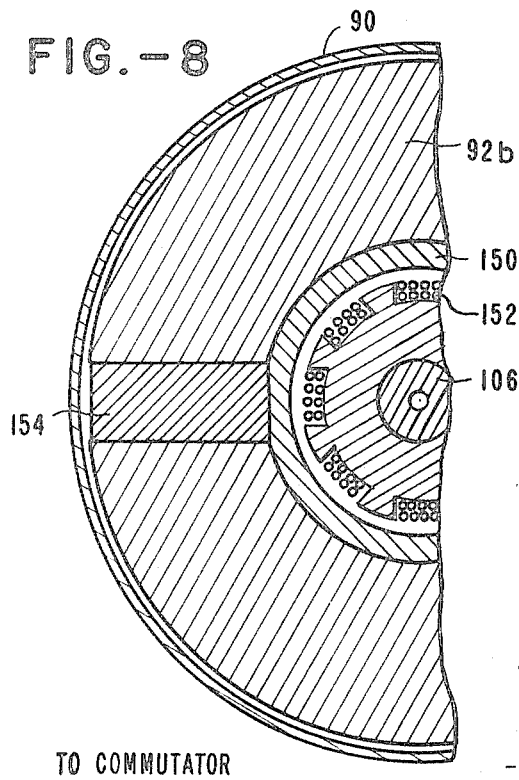
FIG.-8
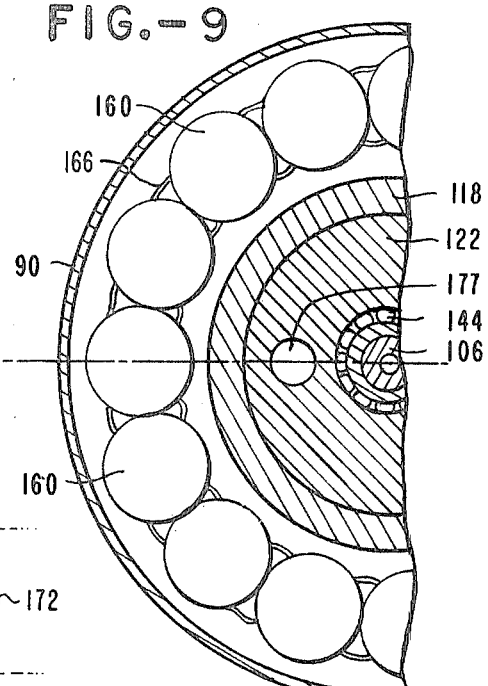
FIG.-9
FIG.-10A
INVENTOR.
RICHARD B. CLARK
BY
Fraser & Bogucki
ATTORNEYS

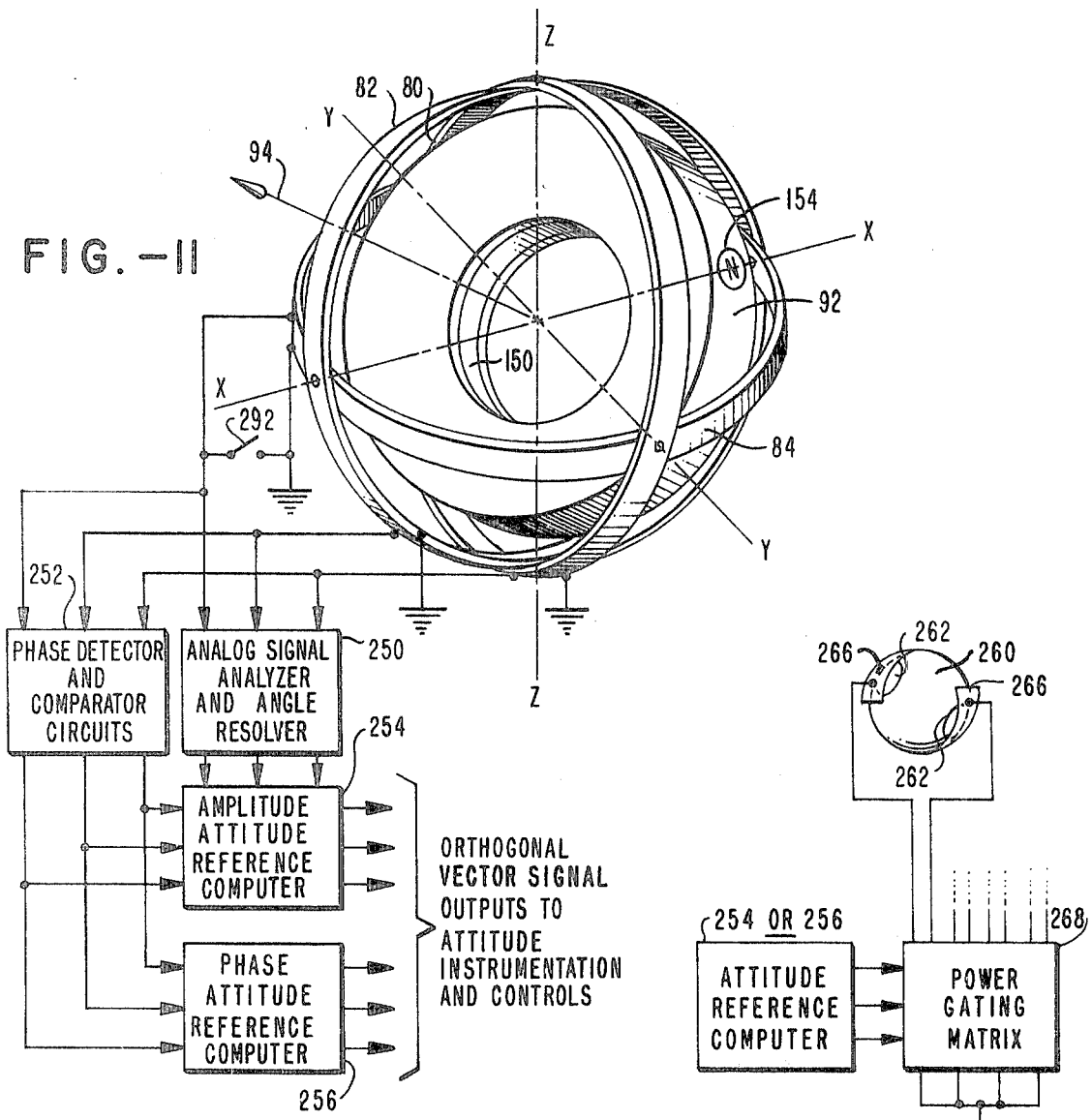
FIG.-11
FIG.-13
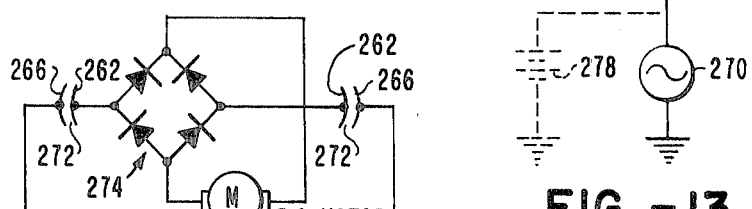
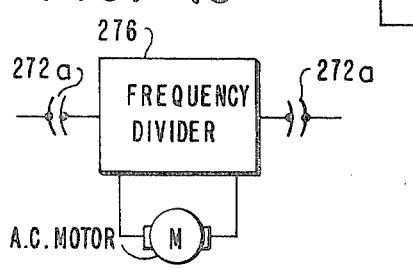
FIG.-15
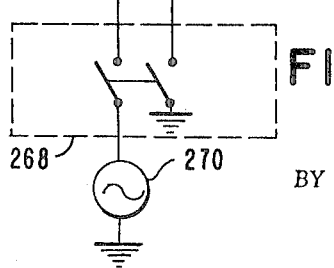
FIG.-14
INVENTOR.
RICHARD B. CLARK
BY
Fraser & Bogucki
ATTORNEYS

FULL-FREEDOM GIMBALLESS GYROSCOPE SYSTEM

BACKGROUND OF THE INVENTION

Gyroscopes are extensively used in a variety of applications for attitude reference and navigational systems in all types of vehicles, particularly aircraft, rocket vehicles and the like. Conventionally gimbaled gyroscopes, however, suffer from certain inherent limitations in their ability to provide accurate attitude reference under conditions resulting from the present trend towards extremely high accelerations and maneuverability.

Random drift of the spin axis in conventional gyros is primarily the result of gimbal bearing friction and constitutes the most serious source of attitude error in conventional gyros. Coulomb friction between solid bearing surfaces in most conventional gimbal systems makes this random drift wholly unpredictable. Bearing friction problems are further aggravated under high accelerational conditions, and most conventional low friction gimbal bearings would either be degraded or severely damaged by accelerational environments of more than 100 g's presently contemplated in some applications.

Previously, liquid flotation systems have been employed to reduce bearing friction in high accelerational environments by reducing weight loads on the gimbals. However, although such flotation systems significantly reduce friction loads on the gimbal bearings, elimination of the problem is not possible due to precession torques and chance contact even though perfect flotation under all temperature and accelerational conditions is maintained.

In addition, conventional, two degree of freedom gyros are also subject to the condition commonly known as gimbal lock. To avoid gimbal lock and the resulting possibility of uncontrolled tumbling, either the freedom of the gyro must be limited or a third gimbal must be added along with complex controls and pickoffs. However, the third gimbal greatly increases system complexity and constitutes yet another source of errors.

To avoid problems of bearing friction, some gyroscope systems have been developed to operate completely without gimbals. In such systems the gyroscope rotor is supported for free rotation either by a gas-bearing or by electrostatic or magnetic force fields. Typically the rotor is driven by an eddy current motor through inductive coupling on the conductive rim of the rotor. However, the attitude response of such previous gimballess systems has been severely limited because the rotor had to remain in substantially the same alignment with the external drive means and the pickoff system used to sense gyro attitude was only capable of measuring small angular displacements. Gas-bearing, electrostatic and magnetic gyro support systems are not suitable where very high accelerations and unlimited maneuverability are required since the forces needed to support the rotor are beyond the practical capabilities of such systems.

BRIEF SUMMARY OF THE INVENTION

This invention provides a truly full-freedom gyro system that is substantially free of acceleration-sensitive drift and attitude limitations, and is capable of operating with unlimited maneuverability even in high accelerational environments.

The rotor and spin motor are completely enclosed within a sealed spherical float which is supported by a liquid medium within a spherical cavity. The gyro spin motor is powered from a supply means contained within the float thus requiring no external physical interconnection to the spherical shell about the float. An inductance-type pickoff arrangement, consisting of three orthogonally oriented, circular sensing coils arranged about the spherical cavity, respond to a rotating magnetic pole carried on the rotor to generate output signals indicative of the float attitude within the cavity with respect to the sensing coil orientation. The gyroscope rotor is thus supported by the float with full attitude freedom within the spherical cavity, and the pickoff arrangement is capable of precisely sensing an unlimited range of attitude angles.

The system also includes a caging mechanism for engaging the float to maintain a desired initial attitude alignment and hold the float against rotation during runup until the rotor has achieved the desired spin rate. The caging mechanism includes a plurality of pins that are inserted through the cavity into receptacles in the float to supply electrical power from an external source to the spin motor during runup. After the rotor has been accelerated to the desired spin rate, the pins are withdrawn to give the float full attitude freedom within the cavity. Thereafter the reduced power requirements of the spin motor needed for maintaining the spin rate are supplied either by storage batteries carried within the spherical float itself or by an external source to the float through conductive or capacitive couplings across the fluid surrounding the float in the cavity.

In an exemplary form of the invention, the spherical shell of the float assembly is supported within the spherical cavity by an arrangement of hydrostatic bearings. Each hydrostatic bearing pad is shaped to fit one of the 90° spherical segments defined between the orthogonally disposed sensing coils. The hydrostatic bearings preserve the free attitude response to the spherical float even under the most severe maneuvering and accelerational conditions, and the arrangement of bearing pads provides a convenient means for transferring electrical power from an external source to the spin motor within the float to either supplement or replace that obtained from battery cells carried within the float itself. For this purpose, the surface of the float may be provided with two conductive circular portions on opposite ends of the float, each covering an area approximating the area covered by one of the hydrostatic bearings formed of a conductive material. Small amounts of power needed to sustain the spin rate can then be transferred to the conductive areas on opposite ends of the float from the pair of closely adjacent bearing pads opposite each end. Using a nonconductive flotation fluid, high frequency alternating electrical power can be transmitted through the capacitive coupling established between the conductive areas on the float and the adjacent bearing pads, and this alternating signal can either be rectified to run the DC spin motor or reduced in frequency to run an appropriate AC motor. Alternatively, using a suitable conductive fluid, DC power can be transferred across the narrow gap between the conductive areas on the float and the oppositely disposed bearing pads.

Preferably, the rotor is driven by a DC spin motor which has a permanent magnet carried on the rotor for rotation about a plurality of stator windings. The rotor is journaled for rotation at the center of the float by duplex bearings disposed at either end so that under all accelerational conditions the load is shared by a bearing at each end. To eliminate additional power requirements and loose metal fragments, a brushless DC spin motor is preferred of the type employing optical shutters on the rotor to gate light to photocells on the stator which distribute current flow in the appropriate direction through the stator windings.

Magnetic pole pieces carried by the rotor provide pole tips of opposite polarity at the rotor periphery. As the rotor spins, flux from the tips of the pole pieces on opposite sides cut the windings of the sensing coils to generate output signals having amplitude and phase characteristics indicative of the angular displacement of the spin axis from the sensing axis of each coil. The amplitude of the output signal from any given coil corresponds to the cosine of the angle between the plane of the coil and the spin axis, and the relative phase relationship between the output signals from the three coils is uniquely indicative of the spin axis alignment relative to the orthogonal alignment of the coils. In addition, the sensing coils can be employed in erecting or restoring the gyro to a desired initial alignment merely be shorting the coil whose sensitive axis corresponds to the desired spin axis alignment or by applying an appropriate erecting signal to the coil.

As another aspect of the present invention, an all-attitude reference system, or stable platform, may be provided by mounting two of the described gyros on a suitable support with the spin axes of the gyros initially set in a known angular relation, such as at right angles, to one another. A signal conditioning or computer means, in response to the pickoff outputs, furnishes the desired attitude signals with respect to a three dimensional reference coordinate system. Mounted in a vehicle, having orthogonal pitch, yaw and roll axes, and with the spin axis of one of the gyros initially parallel to the pitch axis and the spin axis of the other gyros parallel to the yaw axis, for example, this reference system provides complete attitude information for any vehicle orientation in terms of vehicle coordinates.

BRIEF DESCRIPTION OF THE DRAWINGS

Objects and advantages other than those indicated above will be apparent from the Detailed Description, below, when read in connection with the accompanying drawings, in which:

FIG. 1 is a perspective view of the exterior of a gyroscope system according to the present invention;

FIG. 4 is a perspective, schematic view of an array of hydrostatic bearing pads utilized in the gyroscope system of the present invention;

FIG. 7 is a section view of the float of FIG. 3 taken along the plane 7–7;

FIG. 8 is a section view of the float of FIG. 3 taken along the plane 8–8;

FIG. 9. is a section view of the float of FIG. 3 taken along the plane 9–9;

FIG. 10A is a schematic of an alternative form of power supply circuit which provides positive speed control of the gyro motor;

FIG. 11 is a schematic and block representation of the pickoff system of the present invention;

FIG. 12 is a partial sectional view of a float shell for use in an alternative embodiment of the present invention;

FIG. 13 is a schematic and block representation of a motor current supply system used in connection with the alternative embodiment employing the float shell of FIG. 12;

FIG. 14 is a schematic of a circuit used in connection with the alternative embodiment of FIGS. 12 and 13;

FIG. 15 is a partial schematic representation of an alternative circuit for driving an AC rotor drive motor.

DETAILED DESCRIPTION

Figure 2:
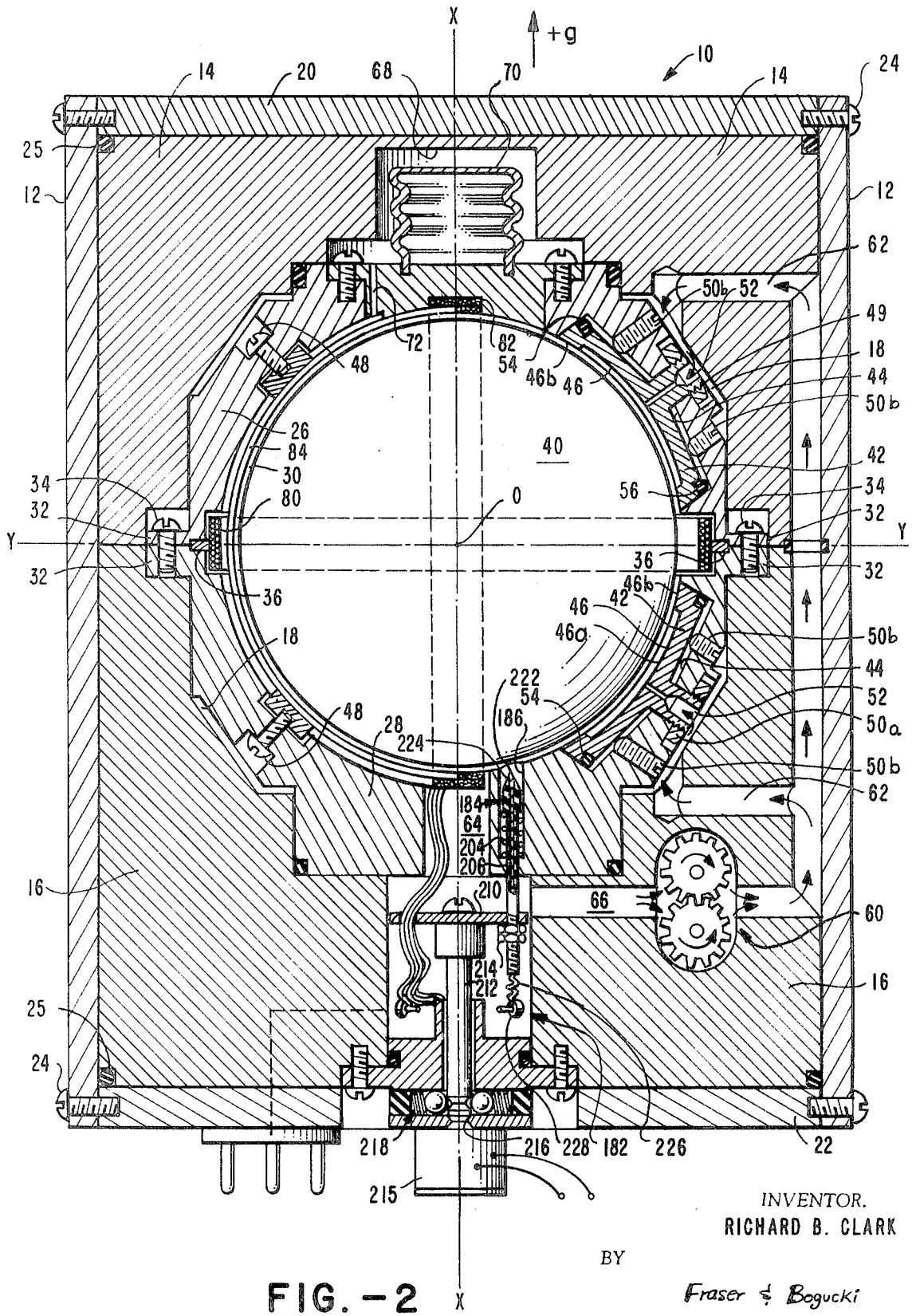
FIG. 2 is a composite section view of the gyroscope system of FIG. 1 taken along 2–2.

Referring to FIGS. 1 and 2, a gyro system 10, according to one form of the present invention, is shown which includes a tubular outer housing 12 enclosing a pair of cylindrical bodies 14 and 16 which between them define an internal space 18. The bodies 14 and 16 are held in place by end plates 20 and 22 secured to the outer housing 12 by a series of screws 24 and sealed by O-rings 25. Supported within the space 18 is a pair of generally hemispherical structures 26 and 28 which define a substantially spherical, fluid-type cavity 30. The hemispheres 26 and 28 are provided with mating flanges 32 joined together by appropriate fastening means, such as bolts 34, and clamp-on ring 36.

The gyro system described thus far may be conveniently related to an arbitrary coordinate system consisting of mutually orthogonal axes XX, YY and ZZ, which define planes XY, XZ, and YZ. The housing 12 is concentric with the longitudinal axis XX, and the geometric center of the spherical cavity 30 coincides with the origin 0. Axis YY may be viewed as the lateral axis and axis ZZ the vertical axis.

A spherical float 40, to be described in detail later, is hydrostatically suspended within the cavity 30. Specifically, in the embodiment shown, the float 40 is supported within the cavity 30 by a symmetrical arrangement of eight hydrostatic bearing pads 42 mounted in recesses 44 in the walls of the hemisphere structures 26 and 28. Each pad 42 is attached to the hemisphere 26 or 28 by a bolt 49 that engages threads provided on a backward extension. Three or more pad adjustment screws 50 extended through the body of the hemisphere structures 26 and 28 contact the rear of each bearing pad 42 to permit minute tilting adjustments of the pad 42 so that a uniform gap will exist (in the absence of extraneous disturbing forces on the float) between the face 46b and the outer surface of the float 40. The central area of each pad face 46 is provided with a depression 46a leaving a surrounding, raised margin 46b of substantially constant width. Fluid introduced into the gap around the float under pressure through an inlet orifice 52 in the center of each pad face 46 flows outwardly across the depression 46a and over the raised margin 46b to form the hydrostatic bearing. The 46a temporarily contains a larger volume of fluid than would be present if the face 46 were smooth thereby reducing viscous drag and increasing the area over which the pressure acts. Typically, the gap between the outer surface of the float 40 and the depressed central area 46a of the pad face 46, for a 2.5 inch diameter float is approximately 0.020 inch with the gap at the raised margin 46b approximately 0.003 inch. A resilient gasket 54 is seated within a peripheral step 56 in the rear face of each pad 42 to provide a fluidtight seal around the edge of the pad.

A positive displacement pump such as gear pump 60, mounted in a cavity in the body member 16 and driven by suitable motor means (not shown), delivers the fluid to the bearing pads 42 at a substantially constant rate through a manifold arrangement comprising passages 62, formed in the body members 14 and 16, and communicating with the inlet orifices 52. Fluid from the cavity 30 drains through an outlet 64 back to the inlet of the gear pump 60 via a return conduit 66. A constant amount of fluid sufficient to fill the fluid system, at least within the spherical cavity, is continuously recirculated by the pump 60. Changes in the volume of the fluid or in the fluid capacity of the system due to ambient temperature variations may be handled either by closely regulating system temperature at a constant level, which is in any case desirable, or by providing a suitable reservoir to compensate for expansion or contraction. As shown in FIGS. 1 and 2, a reservoir cavity 68 surrounds a flexible bellows 70 containing air or other compressible gas and is connected via a fluid passage 72 to the spherical cavity 30 to provide a variable volume which expands and contracts with variations in the fluid capacity within the the cavity. With the bellow 70 located forward of the float cavity 30 with respect to the directions of acceleration, the fluid is introduced into the cavity under pressure to compress the bellows so that it maintains a preload pressure sufficient to prevent bubble formation under the highest accelerational forces, since sudden movements of fluid to displace bubbles could generate unbalanced fluid friction forces on the float surface. In the example of FIGS. 1 and 2, the bellows 70 is oriented along the longitudinal axis XX with positive acceleration forces acting primarily in a direction parallel to the axis XX as indicated by the arrow designated "+g".

The density of the hydrostatic bearing fluid should provide precise flotation of the float 40 within the spherical cavity 30 and should have a relatively low viscosity to minimize the effects of viscous drag on the float. Obviously, the more dense the fluid, the heavier the float structure may be, and thus the more weight, particularly in battery cells, which may be carried within the float. Although most high density fluids also tend to have high viscosity, lubricating fluids with suitably low viscosity for this application are readily available with densities in excess of 1.8 g./cc. Ideal fluids for this purpose are provided by lubricating liquids, such as certain polychlorotrifluorethylene oils, generally known commercially under such names as Fluoro-Chem 208 or Kel-F fluid, which possess low viscosity with relatively high density. Such fluids, having density of the order of 1.8 g./cc., permit a rotor mass of about 100 grams in a float 2.5 inches in diameter and having a total weight of 240 grams. However, even if there is a disparity in the flotation provided by the fluid used, the hydrostatic bearing provides a centering force to prevent the float 40 from bottoming, that is, coming into mechanical contact with the pad surfaces, even under the most severe accelerational conditions. For example, assuming a lack of buoyancy of 4.6 grams, which at 1,000 g's accelerational load becomes approximately 4.6 kilograms, or 10 pounds, the effective pressure difference required to support the sphere out of contact with the bearing pads is only 2 p.s.i.

Three circular coils 80, 82, and 84, lying in rectangular recesses in the wall of the cavity 30 in the XY, XZ and YZ planes, respectively, constitute an unlimited attitude pickoff system for sensing the float orientation. Each coil winding is impregnated with an insulative material to provide rigidity. The coils 80, 82 and 84 are supported by ring 36 and screws 48 in such a way that passages are provided on either side of and behind the coils for the fluid to return from pads 42 to outlet 64.

Figures 3, 5, 6:
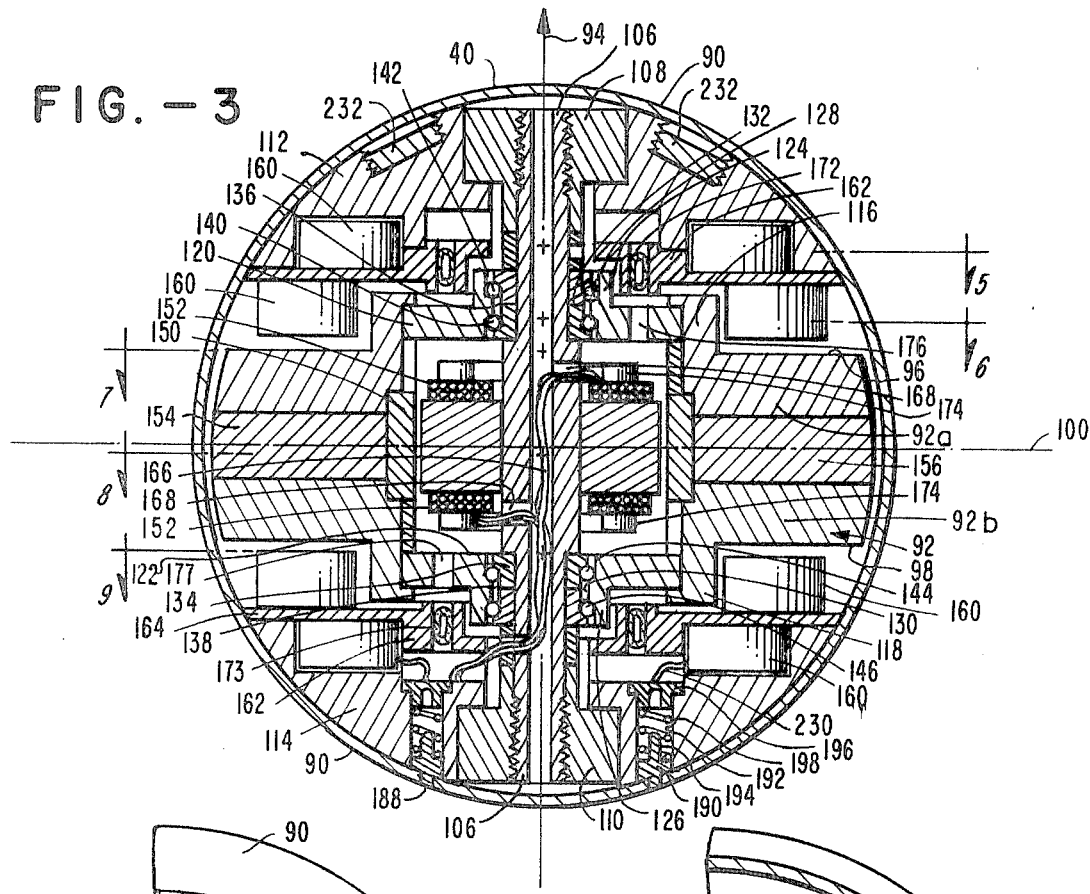
FIG. 3 is a section view of a float according to the present invention for use in the gyroscope system of FIGS. 1 and 2.
FIG. 5 is a section view of the float of FIG. 3 taken along the plane 5–5.
FIG. 6 is a section view of the float of FIG. 3 taken alone the plane 6–6.

Referring now to FIG. 3, the float 40 includes a thin spherical shell 90 of rigid, nonmagnetic material, such as beryllium, that completely encloses an annular gyroscope rotor 92 and its driving elements. The rotor 92 is supported for rotation about a spin axis 94, coinciding with a major diameter of the float, and has faces 96 and 98 symmetrical with a plane 100, lying normal to the spin axis 94 and passing through a diameter of the float. For ease of assembly, the gyro rotor 92 may be made of two parts 92a and 92b, symmetrical with, and joined along the plane 100. The parts 92a and 92b are formed of a heavy, nonmagnetic material, such as brass, and the outer surface of the assembled rotor is contoured to conform to the shell curvature.

Disposed along the spin axis 94 concentrically therewith, is a fixed, tubular axle 106, its ends threadedly received in support blocks 108 and 110 held, in turn, by dome-shaped, spaced segments 112 and 114, respectively, which are formed on insulating material and have outer surfaces contoured to precisely match the inner surface of the shell 90 and suitably attached thereto. The rotor 92 has projecting annular flange portions 116 and 118. Attached to the outer extremities of the flanges 116 and 118 are radially extending, annular rotor support plates 120 and 122, respectively, provided with axial projecting hub portions 124 and 126. The internal surfaces of the hubs 124 and 126 are raised (at 128 and 130) to form the radially outward races of duplex ball bearing arrangements which support the rotor 92 for rotation about the axle 106. The radially inward bearing races consist of split collars 132 and 134, securely mounted on the axle 106, having circumferential, filleted depressions 136 and 138 into which the outer races project. Axially spaced inner and outer ball element sets 140 and 142, respectively, are retained between the depressed collar portion 136 and the raised outer race 128; similarly, axially apaced inner and outer sets of ball elements 144 and 146, respectively, are retained between the depressed collar portion 138 and the raised outer race 130. Conventional single track ball or roller bearings require axial preloads to prevent unloading of one or the other bearing during accelerations. In the unloaded condition, the ball or roller elements life free of their tracks and thus cannot provide any support to prevent radial displacement of the spin axis. With the arrangement of the present invention, loads in either axial direction are always sustained and transmitted by at least one set of ball elements on either side of the rotor 92. For example, with an accelera- tion force applied to the rotor parallel to the spin axis in the direction indicated by the arrowhead on the axis 94, the load is shared by the ball element sets 140 and 144, whereas with an oppositely directed acceleration force, the load is shared by the ball element sets 142 and 146. In contrast, conventional, single track rotor bearings require preloads of at least one-fourth of the maximum load during acceleration to prevent bearing lift-off, while the duplex bearing arrangement employed herein does not require such preloads even for the most severe accelerational conditions. However, it may be desirable to provide a light bearing preload to insure positive radial support of the rotor under zero g conditions by inserting one or more shims of an appropriate thickness between the elements forming the split collars 132 and 134.

The rotor is spun by a direct current motor which includes a permanent magnet 150 carried within a central cavity formed in the rotor 92 and a plurality of fixed stator windings 152 arranged at equal intervals about the axle 106. Preferably, the permanent magnet 150 is in the form of an annular ring and is made of high remanence magnetic material, such as Permalloy, shaped to fit an annular recess extending around the central opening in the rotor. The ring magnet 150 is magnetized so as to have its north and south poles diametrically opposed. Cylindrical magnetic pole pieces 154 and 156, made of a low remanence magnetic material, such as cast iron, are mounted at the poles of the magnet 150 and extend radially outward through openings formed between the rotor halves so that the pole tips terminate at the rotor periphery near the interior surface of the spherical shell 90. The magnetic flux of the magnet 150 is thus concentrated through the pole pieces 154 and 156 and emerges from the pole tips at the rotor periphery to pass through the nonmagnetic shell 90 and cut the windings of the sensing coils 80, 82 and 84 as the rotor spins. To improve the efficiency and accuracy of the pickoff systems, the two hemispherical structures 26 and 28 are made of a high permeability, high resistivity material, such as ferrite, to form a low reluctance magnetic path between the rotating pole pieces 154 and 156. This also shields the sensing coils 80, 82 and 84 and the float 40 from stray magnetic fields and to protect external circuitry from the rotating flux.

To permit full freedom of the float 40 within the cavity 30, electric power for the stator windings 152 during operation must be supplied without external mechanical connections to the float 40. In the embodiment shown in FIGS. 3 and 5—9, this electrical operating current for the stator windings 152 is supplied by an arrangement of rechargeable, disc-shaped battery cells 160 carried within the float 40. The batteries 160 are attached in circular arrays to both faces of the outer rims 164 of a pair of insulating support members 162 disposed on either side of the rotor 92 symmetrical with the central plane 100 and attached to the segments 112 and 114. The battery terminals are connected to one another in an appropriate series-parallel arrangement for providing the desired operating voltages, which are supplied to the windings 152 along connecting leads 166 threaded through openings 168 in the wall of the tubular axle 106.

Electrical current supplied to the stator windings 152 is distributed in the desired direction of flow sequentially through the windings 152 by a suitable commutation system. The commutation system should have low friction drag and be free of loose fragments that might interfere with the free rotation of the gyro rotor 92. Since considerable friction exists between the brush contacts and the sliprings in conventional mechanical commutation systems and sizable fragments can be dislodged by contact wear, an optical commutation system, such as illustrated in FIGS. 3, 5, 6 and 9, has been devised. Miniature light sources 172, 173, mounted in apertures formed in the supports 162, are arranged in circular patterns about the spin axis 94 on both sides of the rotor assembly. The light sources 172, 173 may be individual bulbs "grain-of-wheat" size, each aligned in a direction parallel to the spin axis 94 with a corresponding stator winding 152, or comprise a pair of ring-shaped fluorescent tubes, one disposed on each side of the rotor, mounted in the supports 162 concentric of the axis 94. Photocells 174, mounted on the windings 152 and having outputs connected thereto, respond to the light from the sources 172, 173 when the light passes through axially extending shutter openings 176, 177 formed in the rotor support plates 120 and 122, respectively. As the rotor 92 and its support plates 120 and 122 rotate, light from the source 172 passes sequentially through the shutter opening 176 to successively energize each of the photocell elements 174 on one side of the rotor 92, while light from the source 173 passes through the shutter opening 177 to successively energize the photocell elements 174 on the other side. As the light impinges on each photocell element 174, the current flow is gated, as will be more fully described later, in one direction or the other through windings 152 such that the polarity of the magnetic field produced by the respective winding is approximately 90° displaced from the poles of the permanent magnet 150.

The gyro system of the present invention includes a caging mechanism 182 primarily for maintaining initial alignment of the gyro spin axis 94 prior to and during rotor runup. As shown in FIG. 2, the caging mechanism 182 consists of a plurality of caging pins 184, contained, in the retracted position, in the holes 186 in the hemispherical member 28. In the extended position, the pins 184 project into apertures 188 extending through the outer spherical shell 90 into the interior of the float 40 (FIG. 3). The caging pin apertures 188 each receive a spring loaded plunger 190 shaped at its lower end to fit snugly within the aperture 188 and flush with the outer surface of the shell 90. Each plunger 190 is slidably received within a bore 192 formed in the dome-shaped segment 114 and has an inwardly extending, movable contact 194. When caging pins 184 are inserted into the apertures 188, the plungers 190 move toward stationary contact elements 196 in segment 114 against the action of biasing springs 198 interposed between the plungers 190 and stationary contacts 196.

As shown in FIG. 2, the reciprocating movement of the caging pins 184 can be solenoid controlled. In the particular arrangement shown, the caging pins 184 are biased inwardly, that is, toward the cavity 30, by coil springs 204. The shafts 206 of the pins 184 each extend outwardly through a guide aperture in the hemisphere structure 28. With the caging pins retracted, each coil spring 204 is compressed between the enlarged head of the corresponding pin 184 and the bottom of the bore 186. The expansion force of each spring 204 is in excess of the force exerted on the plunger 190 by the spring 198. The outer extremity of each shaft 206 extends through a hole in a disc 210, which is secured to the inner end of a solenoid armature 212, and each shaft 206 is threaded to receive a pair of locking nuts 214 adjustable along the length of the shaft. The solenoid armature 212 is actuated by a coil 215 and contains a pair of V-shaped detent grooves that are yieldably engaged by a spring loaded ball detent arrangement 218 to hold the armature in either an extended or retracted position. With the armature 212 held in the outermost position, the disc 210 acts on the locknuts 214, against the force of the springs 204 to hold the caging pins 184 flush with the wall of the cavity 30. When the solenoid coil 213 is energized to move the armature 212 toward the cavity 30, the caging pins 184, under the influence of springs 204, move against the outer surface of the float 40. Then, when the tips of the caging pins 184 become aligned with the apertures 188, the stronger springs 204 overcome the force of the lighter coil springs 198 and the pins 184 enter the float 40 causing movable contacts 194 to make connection with the stationary contacts 196. The pins 184 and the receiving apertures 188 are positioned so that in the caged position of the float 40, the spin axis 94 coincides with the reference axis XX and the plane 100 coincides with the reference axes YY and ZZ.

The caging pins 184 also serve as a convenient means for establishing electrical connections for supplying charging current to the batteries 160 and operating power to the windings 152 during runup from an external power source (not shown), thereby preserving the limited power capabilities of the batteries for operation when the rotor has reached steady state speed. For this purpose, each of the pins has an inner, conductive core 222 extending to the tip and surrounded by an insulating sleeve 224. The core 222 is connected at the outer end to the external source by a lead wire 226 coupled to a sealed insulating terminal 228. The inner tip of the core 222 is exposed to make electrical contact with the lower surface of the corresponding, conductive plunger 190. The contact 196 is connected to the batteries by appropriate electrical leads 230.

The float, and all its components, must, of course, form as nearly as possible, a perfectly balanced unit to minimize acceleration sensitive drift resulting from noncoincidence of the center of mass and the geometric center. Imbalance can be compensated for by providing counterweights 232, for example, suitably attached to the segment 112.

Figure 10:
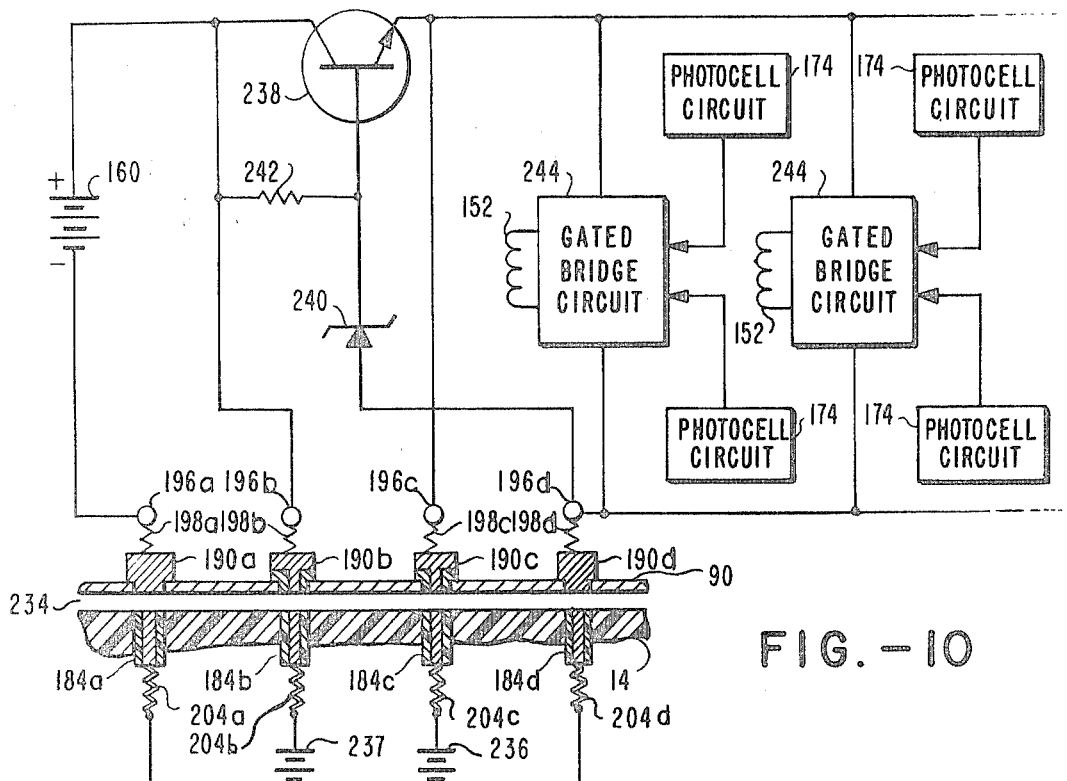
FIG. 10 is a schematic representation of a portion of the gyroscope system of the present invention along with a schematic of an associated electrical battery charging and motor drive circuit.

Referring now to FIG. 10, a battery charging and motor supply circuit, utilizing a four-pin caging mechanism, is depicted schematically. For simplicity of illustration, the caging mechanism has been shown in rectilinear fashion with the four caging pins 184a—184d and the corresponding receptacle plungers 190a—190d and contacts 196a—196d opposite one another across a gap 234 between the shell 90 of the float 40 and the inner surface of the hemisphere structure 28 defining the spherical cavity 30.

The caging pins 184a—184d are shown in the retracted or uncaged position with their tips withdrawn to a position flush with the cavity-defining surface and the plungers 190a—190d are held down by the force of the springs 198a—198d to plug the apertures 188 in the shell 90. Two of the caging pins 184a and 184d are connected by conductive leads directly to the negative terminal of an appropriate external DC power supplies 236 and 237. The other two caging pins 184d and 184c are similarly connected by leads to the positive terminals of the power supplies 236 and 237. The plungers 190b and 190d each have a conductive inner core surrounded by a layer of insulative material to insulate the core from the conductive shell 90, whereas the plungers 190a and 190d are not so insulated so that when the caging pins are retracted, these plungers make electrical contact with the conductive shell 90 to establish an electrically conductive path between them. The plunger 190a is connected to the negative terminal of the internal power supply, that is, the batteries 160, the positive supply terminal of which is coupled to the collector terminal of an NPN control transistor 238. The emitter of transistor 238 is coupled to supply current to the stator windings 152 of the rotor drive motor. The plunger 190d is connected to the other side of the stator windings 152 and also through a Zener diode 240 to the base of the transistor 238. A low valued resistor 242, of the order of 100 ohms, connects the positive terminal of the battery power supply 160 to the base of the switching transistor 238, and together with the reverse connected Zener diode 240 forms a voltage divider circuit which establishes a fixed bias potential at the base of the transistor 238. The plunger 190c is coupled to the emitter terminal of the transistor 238, while the remaining receptacle plunger 190b is connected to the positive terminal of the battery power supply 160.

In operation, with the caging pins 184a—184d in the uncaged position, that is, out of contact with their respective receptacle plungers 190a—190b, the battery power supply 160 is connected across the motor windings 152 to provide current to be distributed by the optical brush system. Operating current from the positive terminal of the battery supply 160 flows through the transistor 238 to the windings 152 and follows a return path through the uninsulated receptible plungers 190a and 190d, connected by the conductive shell 90, to the negative terminal of the battery supply 160. The transistor 238 conducts in an emitter follower mode with its collector-to-base potential established at a fixed value by the Zener diode 240 to maintain a constant voltage to the windings 152 sustaining the desired spin rate.

On the other hand, when the float 40 is caged by inserting the caging pins 184a—184d into their respective receptacles, the plungers 190a—190d are lifted free of contact with the conductive float shell 90 and electrical contact is established between the exterior and interior circuitry via the tips of the pins 184a—184d. With these contacts established, the battery power supply 160 within the float 40 is connected across the external power supply 237 to receive charging current with its negative terminal coupled to an external ground potential through the plunger 190a caging pin 184a, and the dropping resistor 239 its positive terminal coupled to the positive terminal of the external supply 237 through the pin 184b, its associated plunger 190b. The positive terminal of the external supply 236 is also connected through the pin 184c and plunger 190c to the emitter terminal of the transistor 238 and supplies operating current to the spin motor windings 152. The return path from the armature windings 152 is established through the pin 184d and plunger 190d to ground. Since the emitter of transistor 238 is maintained at a slightly higher potential than the bias potential established at its base terminal by the voltage divider consisting of the resistor 242 and the Zener diode 240, the transistor 238 is nonconductive during caging so that the battery power supply 160 is effectively disconnected from the motor windings 152. Thus, the cells of the power supply 160 are charged independently while operating current is supplied from the external source 236 to the motor for runup.

Separate external power supplies 236 are shown employed for charging the batteries 160 and for running the spin motor, rather than using a single external supply, since battery charging usually requires a well regulated high impedance source whereas quick starting is best accomplished by a low impedance source. However, the two supplies may be considered and in some cases actually be provided by a single external source.

In the form of the invention shown, employing an optical brush system, the current flow through each of the motor stator windings 152 is controlled in a given direction and with a selected timing by the action of the photocells 174 through appropriate switching circuitry. Any suitable type of distribution circuit may be employed, but due to space and cost limitations, the circuit should employ as few elements as possible and be relatively compact. For example, conventional gated bridge circuits 244, each consisting of only four switching transistors or controlled rectifiers, are employed. The input terminals of each bridge circuit 244 are connected across the DC power supply with the corresponding winding 152 connected across the output terminals. The photocells 174 on one side of the stator, when energized, generate a gating signal for one pair of the gating elements located in opposite legs of the bridge circuit 244 to produce current flow in the appropriate direction through the windings 152, whereas the photocells 174 on the other side of the stator provide a gating signal, when energized, to the pair of gating elements in opposite legs to produce current flow through the windings 152 in the other direction. For simplicity, the details of these conventional circuit arrangements are not illustrated herein, since their implementation is easily within the capabilities of those skilled in basic electronics. Also, of course, it should be understood that where accuracy requirements permit the cost considerations are important, conventional low friction brush and slipring arrangements can be employed instead of the optical brush arrangement to distribute driving power to the windings 152.

Referring to FIG. 10a, another form of power supply circuit is preferred under high accelerational conditions where simple voltage control cannot maintain constant rotor speed because of changing frictional loads. This circuit employs a separate speed sensing winding 300 electrically insulated from, but wound with, one of the stator windings 152. The rotating magnet 150 induces in the sensing winding 300 an alternating voltage signal with an amplitude indicative of the rotor speed which is coupled through a diode 302, which eliminates negative half cycles, to a smoothing capacitor 304. The positive DC voltage developed across this smoothing capacitor 304 is applied as one of the inputs to a voltage comparison circuit, such as the operational amplifier 306, to be compared with a reference voltage indicative of the desired rotor speed. As shown, the reference voltage may be selected by the setting of a potentiometer 308 connected across the internal power supply 160. When the voltage across capacitor 304 reaches the amplitude of the reference voltage, the output from the operational amplifier 306 is reduced and thus can be used to reduce the current excitation supplied to the windings 152 from the power source 160 to maintain the rotor 92 at constant speed. In the particular arrangement shown in FIG. 10a, this is accomplished by supplying the output from the operational amplifier 306 through a diode 310 to the lamps 172. Thus when the rotor speed reaches the desired speed, the lamps 172 cut off so that the commutator circuits no longer are switched to supply power to the stator windings 152. Alternatively, the output from the operational amplifier 306 might be applied to control the flow of current to the commutator circuits directly rather than being used to control the lamps 172. The rotor speed can be maintained constant even when variable friction loading is experienced due to high accelerations.

Referring now to FIG. 11, there is schematically illustrated the rotor 92, its spin axis 94 and the pickoff, system including the three orthogonally disposed sensing coils 80, 82 and 84 and associated logic circuitry. During rotor rotation, magnetic flux emanating from the opposite polarity pole pieces 154 and 156 carried by the rotor 92, periodically cuts the windings of the sensing coils 80, 82 and 84 to produce output signals indicative of the orientation of the gyro spin axis with respect to the plane of each winding. Each time the flux from one of the pole pieces cuts the windings of one of the sensing coils, the amplitude of the output signal produced is proportional to the speed with which the pole piece passes the windings. Ideally, with the rotor spin axis aligned perpendicular to the plane of one of the sensing coils 82, 82 or 84, no output signal would be generated in that coil because flux from the pole pieces does not cut across the windings but simply rotates in the direction of the windings. With the rotor spin axis slightly tilted from the axis perpendicular to the plane of the winding, only a small output signal is produced since the rate of flux variation cutting the windings is relatively small and takes place slowly. However, when the rotor spin axis lies in the plane of one of the sensing coils 82, 82 and 84, the flux from the pole pieces 154 and 156 cuts across the remaining windings at maximum speed and varies from zero to its maximum and then back to zero in a relatively short time. When the gyro spin axis is aligned approximately as shown in FIG. 11, that is, tilted at 35¼° with respect to each of the coil planes to pass through the center of one of the triangular spherical segments defined between the coils, then the flux from the pole pieces 154 and 156 cuts each of the sensing coils 80, 82 and 84 at approximately the same rate to produce output signals from each coil of approximately the same amplitude. Therefore, assuming a constant spin rate, the amplitude of the output signal from each sensing coil is proportional to the sine of the angular displacement of the spin axis from the sensing coil axis normal to the plane of the coil.

Accordingly, the output leads from the sensing coils can be coupled as separate inputs to an analog signal analyzer and angle resolver 250 for generating output control signals for attitude control or instrumentation use. The particular computation circuitry of the analog signal analyzer and angle resolver is not described herein, since means for performing such computations are well known in the art. HOwever, to compensate for possible variations in spin rate, the amplitude of the output signals from each of the sensing coils should be compared against a normalized signal amplitude that is indicative of the absolute spin rate. This is best accomplished in the analog signal analyzer and angle resolver 250 by computing a total vector amplitude $S$ by the equation:

$$S = \sqrt{\frac{a^2 + b^2 + c^2}{2}}$$

where $a$, $b$, and $c$ are signal amplitudes from coils 82, 82 and 84, respectively.

Using the total vector quantity $S$, the direction cosine for the angular displacement of the spin axis from each of the respective coil axes would be computed by the equations:

$$p = \sqrt{1 - \left(\frac{a}{S}\right)^2}$$

$$q = \sqrt{1 - \left(\frac{b}{S}\right)^2}$$

and $$r = \sqrt{1 - \left(\frac{c}{S}\right)^2}$$

where $p$, $q$, and $r$ are the respective direction cosines. The direction cosine quantities computed are particularly useful in the operation of signal attitude controls operated to control vehicle attitudes with respect to the sensing coil axes.

However, analysis of the output signals from the sensing coils 80, 82 and 84 based upon amplitude alone is subject to positional ambiguities as to identical angular positions in opposite spherical quadrants. Also, pickoff measurements of angular position tend to be inaccurate for small angular displacements between the spin axis and a sensing coil axis. This may be minimized by reducing the widths of the sensing coils relative to the area of the tips of the pole pieces 154 and 156, but the problem remains.

Positional ambiguity resulting from amplitude measurements may be resolved by phase comparison of the output signals. With the rotor spin axis 94 in different positional alignments with respect to the sensing coils, the sequence with which the opposite polarity pole pieces 154 and 156 pass the individual sensing coils is uniquely related to each possible position of the spin axis. Thus, the phase relationship between the alternative output signals from the three sensing coils is uniquely indicative of the spin axis alignment. Therefore, the output signals from the three sensing coils can be coupled as inputs to phase detector and comparison circuits 252, where the phase of each is established and compared with the others. Outputs from the phase circuits 252, indicative of the phase relations, may then be used together with the outputs from the analog signal analyzer and angle resolver 250, in an amplitude attitude reference computer 254 to determine the exact angular alignment of the rotor spin axis 94. When so used with outputs from the analog signal analyzer and angle resolver 250, the outputs from the phase analyzer 252 need be nothing more than a relatively simple phase sequence indication that permits resolution of positional ambiguities. On the other hand, precise measurements of the sequence and phase difference between the three signals can themselves be used to compute exact angular quantities of spin axis displacement in each of the three orthogonal directions in an appropriate phase attitude reference computer 256. Moreover, by proper computational analysis of the wave shape or pulse duration produced, exact figures can be obtained for even the smallest angular displacements of the spin axis from the respective sensing coil axis. Since the particular analyzer and computation circuitry employed for performing these tasks would involve only conventional logic techniques and the details of these circuits will not constitute a feature of this invention, these circuits will not be illustrated or described in detail herein. Typically, precise phase measurements may be obtained using conventional phase-lock techniques or the like with the angular components of the spin axis displacement being computed from the angular displacements measured between the phase of the three pickoff signals by conventional analog to digital computer techniques, such as are used in many prior art attitude reference systems.

While most attitude reference systems used in ballistic missiles and the like are required to operate for only a relatively short time period, certain applications particularly for aircraft and space vehicles may require continued operation over extended periods. The batteries 160 carried within the float 40 can operate for only relatively short periods. Accordingly, for extended operation, the power supplied to run the spin motor must be derived from a source of greater capacity which is external to the float 10, but without any physical connection between the float 10 and its surrounding apparatus.

Referring now to FIGS. 4 and 12—14, an alternative electrical energy transmission scheme is depicted. The float shell 260, instead of being made completely of a conductive material, includes circular conductive segments 262 at opposite poles which are centered, that is, symmetrical with respect to the gyro spin axis 94 and separated from each other by an intermediate portion 264 of the shell, which portion is formed of a nonconductive, insulative material. The circular conductive segments 262 have an included angle of 90° and are centered with respect to spin axis 94 (for clarity, only two of the eight bearing pads are shown in FIG. 13). The bearing pads 266 are made of conductive material and are electrically connected through a suitable power gating circuit 268 to receive operating power from an appropriate AC source 270. The gating circuit 268 receives gaging control signals from an attitude reference computer, such as 254 or 256 in FIG. 11, indicative of the instantaneous angular position of the gyro spin axis, which, in turn, determines the particular bearing pads 266 that are immediately adjacent the conductive segments 262.

In the arrangement of FIGS. 12—14, a relatively high frequency alternating current power signal, for example, 120 volts at 1 mHz, from source 270 is supplied to one or more pairs of bearing pads 266 on opposite sides of the float that overlie the conductive segments 262. The bearing fluid is nonconductive with good dielectric properties so that the high frequency alternating current is thus transferred from the bearing pads 266 across the gap 272 (between the shell 260 and bearing pads 266) to the segments 262 by capacitive coupling. Within the float 40, as shown in FIG. 14, the conductive segments 262 are connected to opposite input terminals of a full wave rectifier circuit 274 that converts the high frequency AC to a DC signal for driving the DC spin motor.

Alternatively, as shown in FIG. 15, the alternating current signal within the float derived across the capacitive gap 272a may be used to drive an appropriate AC spin motor. In this case, there is no need for a brush system, but the high frequency signal necessary for achieving efficient power transfer through the capacitive coupling to the float would be applied through a frequency dividing circuit 276 to reduce the frequency to a value suitable for driving the AC motor.

As a further alternative, shown by the broken lines in FIG. 13, with the use of an appropriate conductive flotation fluid, DC power from an external source 278 may be applied to the float through opposite paths of bearing pads 266 overlying the conductive circular segments 262. This method of power transfer, however, is relatively inefficient because of power leakage around the float through the conductive flotation fluid. Efficiency is maximized if the resistivity of the conductive fluid is high enough to ensure that the resistance through the conductive fluid between opposite bearing pads 266 is high relative to the total resistance of the path directly across the gap from the bearing pads 266 to the conductive segments 262 and through the spin motor stator windings 152.

Figure 16:
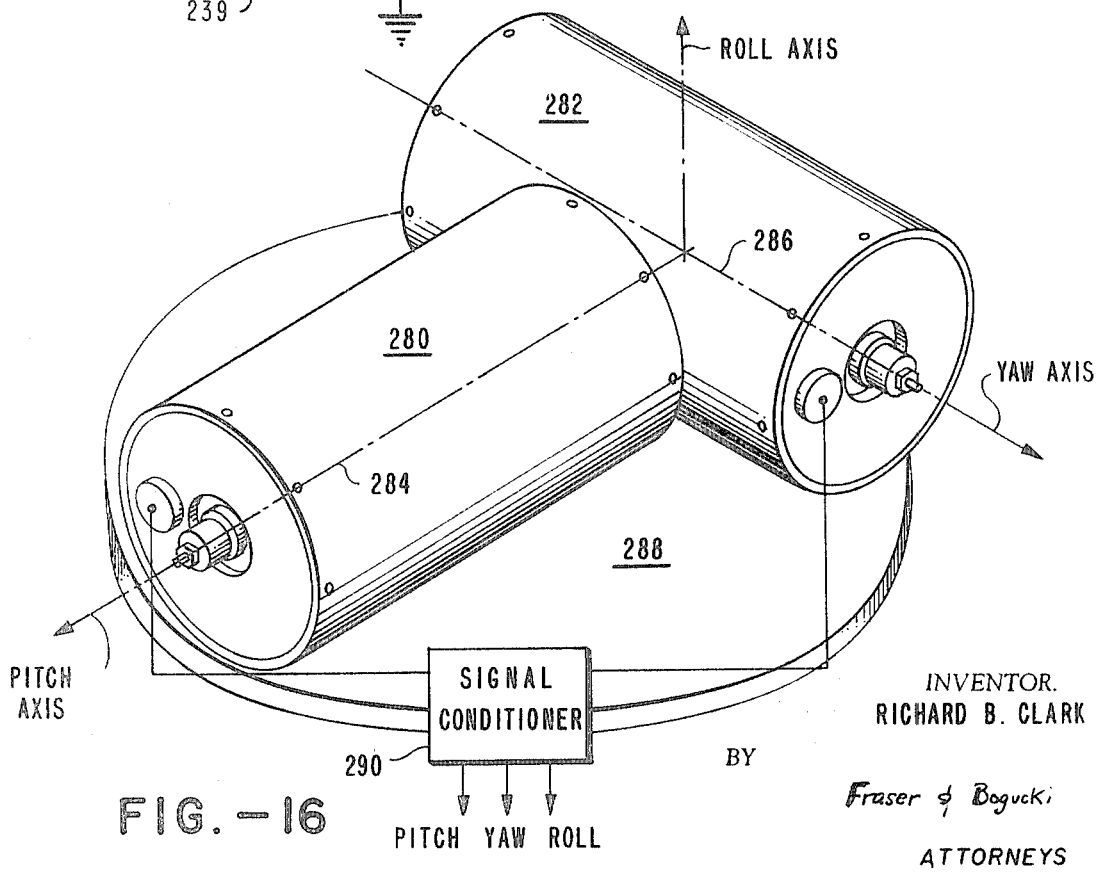
FIG. 16 is a schematic, perspective view of an all-attitude reference system employing two gyroscope systems of the present invention.

Referring now to FIG. 16, an all-attitude gyro reference system is provided, including two full-freedom gyro systems 280 and 282, in accordance with the invention, with their spin axes 284 and 286, respectively, initially 90° apart. A mounting means 288 supports the gyro systems. In accordance with the usual practice, the gyro spin axes 284 and 286 are aligned perpendicular to the roll axis of the system and parallel to the pitch and yaw axes, respectively. The outputs of the two gyro systems can then be processed by a conventional signal conditioner 290 which transforms the gyro pickoff outputs to pitch, yaw and roll attitude signals, which are measured in vehicle coordinates for convenient use in the vehicle instrumentation and attitude control systems.

In systems where the gyros, after use, are to be recaged for later operation, the float 40 must be returned to its upright position to permit insertion of the caging pins 184 into the apertures 188 in the float. The float 40 is most easily restored to its upright position by shorting the windings of the sensing coil 80, the axis of which corresponds to the desired initial alignment of the spin axis 94. Usually, after a series of maneuvers over a period of time, the spin axis will be only slightly misaligned due to viscous drag on the surface of the float, so that the gyro does not return exactly to its initial alignment even though the system is returned to its exact starting point in inertial space. Such misalignments are normally very small compared to the alignment errors resulting from gimbal bearing friction in conventional gyros, and the errors themselves are predictable and easily compensated since there are no coulomb friction discontinuities and hysteresis. Therefore, assuming that this misalignment does not exceed 90° from the axis of the coil 80, shorting the coil windings, as shown in FIG. 11, by means of a simple switch 292, results in relatively large currents being induced in the windings by the flux from the rotating pole pieces 154 and 156. The current flow induced in the coil 80 produces a magnetic field through the coil that applies a restoring torque to the rotor 92 tending to align the plane of rotation of the pole pieces 154 and 156 with the plane of the coil, which represents the lowest energy condition of the system. Since the applied torquing force on the rotor 92 is directly towards the desired alignment, precession of the spin axis 94 is generally in a direction normal to the direct path for realignment so that the spin axis spirals inward until it reaches the desired alignment with the coil axis.

To achieve faster alignment, alternating currents might be applied to the coil in such a phase relationship that the float would be torqued by eddy currents in a shell 90 in the manner of an induction motor, the spin axis 94 to precess directly towards axis XX. Other means of obtaining float realignment might involve the use of pneumatic jets applied to the float surface at various points as necessary, based upon the known alignment of the spin axis.

What I claim is:

1. A gyroscope system comprising:
a body defining a spherical cavity;
a spherical, hollow float disposed within said cavity;
a gyroscope rotor within said float, journaled for rotation about a selected spin axis through the center of said float;
driving means contained within said float for rotating said rotor;
a support system including a relatively low viscosity flotation fluid having a density of approximately the same density as said float and completely surrounding said float within said cavity to maintain the outer surface of said float out of mechanical contact with said body;
energy radiating means carried for rotation at the periphery of said rotor, said float being permeable to the energy radiated; and,
sensing means attached to said body and responsive to the energy radiated from the rotor for generating output signals indicative of the orientation of said spin axis with respect to said body.

2. The gyroscope system of claim 1 wherein:
said energy radiating means consists of diametrically opposed magnetic pole pieces of opposite polarity for radiating a magnetic field from the periphery of said rotor, said float being of a nonmagnetic material; and,
said sensing means comprises three magnetic field sensing coils mounted within said cavity to encircle said float, each said coil lying substantially in a plane mutually orthogonal with respect to the planes of the other coils, and each said coil having a central axis extending perpendicular to the plane of said coil.

3. The gyroscope system of claim 2 wherein:
said flotation system further includes a plurality of hydrostatic bearing pads defining the interior of said cavity, each having a spherical bearing surface corresponding substantially to the quadrature spherical segment defined between the orthogonally arranged sensing coils.

4. The gyroscope system of claim 2 further comprising:
circuit means connected to receive said output signals from each of said sensing coils and responsive to the amplitude of said output signals for generating directional outputs indicative of the angular displacement of said spin axis of the float from each of said coil axes.

5. The gyroscope system of claim 2 further comprising:
circuit means connected to receive said output signals from each of said sensing coils for detecting the phase of each of said output signals and the relative phase sequence of the output signals from each of said sensing coils; and,
means responsive to the differences in phase and the detected phase sequence for providing directional outputs indicative of the angular displacement of said spin axis from each of said coil axes.

6. The gyroscope system of claim 2 further comprising:
circuit means connected to receive the output signals from each of said sensing coils and responsive to said output signals for generating directional outputs indicative of the angular displacement of said spin axis from each of said coil axes.

7. The gyroscope system of claim 1 wherein:
said driving means includes a direct current motor powered by battery means carried within said float.

8. The gyroscope system of claim 7 wherein:
said motor includes a generally cylindrical stator comprising a plurality of windings, said stator being mounted concentric of said spin axis;
a generally cylindrical, permanent magnet rotor having a central, concentric opening for receiving said stator, said rotor being journaled for rotation about said stator concentrically therewith; and,
an optical brush system comprising light source means disposed about said spin axis adjacent said rotor, a plurality of photocell means each associated with one of said stator windings and disposed about said spin axis to be selectively activated by said light source for providing current flow in a given direction through the associated armature winding, and optical shutter means carried by said rotor and interposed between said light source means and said photocell means for selectively activating each of said photocell circuits in synchronization with the rotation of said rotor.

9. The gyroscope system of claim 3 further comprising:
a source of electrical power external to said spherical cavity;
first and second conductive segments forming the spherical exterior surface of said float at opposite ends of said spin axis, each of said bearing pads having a conductive surface adjacent said float;
gating means responsive to said coil outputs for selectively providing electrical power from said source to the oppositely disposed pairs of said bearing pads having their conductive surface immediately adjacent said conductive segments on said float, said electrical power being transferred from the surface of said bearing pads to the conductive segments on said float; and, in which:
said rotor driving means includes a motor means and a power control circuit within said float connected to said conductive segments to supply the transferred electrical power to said motor.

10. The gyroscope system of claim 9 wherein:
said external source of electrical power is a high frequency alternating current source;
said motor in a direct current motor;
said power control circuit includes a rectifier circuit connected between said conductive segments to rectify the high frequency alternating current transferred from said bearing pads to provide direct current for driving said motor; and,
said flotation fluid is a nonconductive insulative liquid having good dielectric properties.

11. The gyroscope system of claim 9 wherein:
said external source of electrical power constitutes a high frequency alternating current source;
said motor is an alternating current motor operating at a relatively low frequency;

said power control circuit includes a frequency divider circuit connected to said conductive segments to receive the high frequency alternating current power transferred from said selected bearing pads and for providing relatively low frequency alternating current for operating said motor; and, said flotation fluid is a nonconductive insulative fluid having good dielectric properties.

12. The gyroscope system of claim 9 wherein:

said external electrical supply source is a source of direct current;

said flotation fluid is conductive but has a relatively low conductivity;

said motor is a direct current motor; and, said power control circuit includes a voltage regulator circuit connected to said conductive segments for supplying the direct current power transferred from said bearing pads at a predetermined voltage to drive said motor.

13. A gyroscope system for use in high accelerational environments comprising:

a body defining a spherical cavity;

a spherical, hollow float disposed within said cavity;

a flotation system including a flotation fluid for supporting said spherical float out of mechanical contact with said body and with approximately zero buoyancy for free rotational movement within said cavity;

a gyro rotor having a spin axis;

means for rotatably supporting said gyro rotor within said float with its spin axis extending along an axis of said float;

drive means contained within said float for rotating said rotor; and, means attached to said body within said spherical cavity and responsive to the rotation of said rotor for sensing the angular position of said spin axis relative to selected axes of said body structure.

14. The gyro system of claim 13 in which:

said means for rotatably supporting said gyro rotor includes symmetrically disposed, axially extending hub portions on opposite ends of said rotor, an axle fixedly mounted within said float along said float axis, and duplex bearings spaced equidistant from a plane of symmetry perpendicular to said float axis for supporting said rotor, each said duplex bearing including a radially outer race comprising a filleted projection on said hub directed radially inwardly, a radially inner race comprising a split collar mounted on said axle and having a circumferential, cup-shaped depression into which said outer race extends; and, axially inner and outer sets of ball elements interposed between said outer race and said inner race, said split collar adapted to be axially shimmed for preloading said bearing.

15. The gyro system of claim 13 further comprising:

a plurality of hydrostatic bearing pads affixed to said body structure within said cavity and providing spherical bearing surfaces conforming to spherical segments of the exterior surface of said float; and, means within said body structure for delivering said flotation fluid under pressure through a central opening in the bearing surface of said bearing pads to thereby support the exterior surface of said float.

16. The gyro system of claim 13 further comprising:

a caging apparatus consisting of a plurality of caging pins mounted within said body structure for reciprocal movement toward and away from said spherical cavity;

said float including a plurality of caging pin receptacles formed in said float for receiving said caging pins; and, means for reciprocally moving said caging pins to selectively insert them within said receptacles to hold said float with its selected axis aligned with a predetermined axis of the body structure to prevent rotation of said float during acceleration of said rotor to the desired spin rate.

17. The gyro system of claim 16 wherein:

said driving means includes a DC spin motor disposed within said float, said motor including a permanent magnet carried by said rotor and a plurality of stator windings mounted within said float in operative relation with said permanent magnet, and power supply means consisting of a plurality of battery cells mounted within said float to supply operating power to said stator windings.

18. The gyro system of claim 17 further comprising:

means for supplying direct current from a source external to said float connected to said plurality of caging pins, said caging pins each having a conductive core for coupling said direct current power to the tip, said caging pin receptacles in said float having means for selectively contacting the tips of said caging pins to couple said direct current power from the external source to said stator windings for supplying operating power during acceleration of said rotor to the desired spin rate; and, circuit means connected between said battery cells and said stator windings for disconnecting said battery cells from said stator windings whenever the caging pins are inserted and for permitting the flow of operating current from said battery cells to said stator windings when the caging pins are withdrawn from the caging pin receptacles.

19. A gyroscope reference system comprising:

a pair of gyroscope systems, each gyroscope system including:

a body defining a spherical cavity;

a spherical float disposed within said cavity;

hydrostatic bearing means for suspending said float within said cavity completely out of mechanical contact with said body;

gyro rotor means mounted for rotation within said float about an axis fixed with respect to said float;

means contained within said float for rotatably driving said motor; and, three dimensional pickoff means attached to said body and cooperating with said float for sensing the attitude of said float relative to said body;

means for mounting said pair of gyroscope systems; and, signal conditioning means responsive to said pickoff means of said pair of gyroscope systems and having outputs representing the angular displacement of selected axes of said mounting means from reference axes.

20. An all-attitude reference system for use in a vehicle, said vehicle having pitch, yaw and roll axes, comprising:

a pair of gyro systems, each system including:

a body defining a cavity;

a spherical float disposed within said cavity;

hydrostatic bearing means for suspending said float within said cavity completely out of mechanical contact with said body;

gyro rotor means mounted for rotation within said float about a spin axis fixed with respect to said float, said rotor carrying magnet means generating a magnetic flux, said float being permeable to said flux;

pickoff means including three mutually orthogonal planar coils attached to said body about said cavity, each said coil producing an electrical signal when cut by said flux during rotor rotation, said pickoff means having outputs; and, caging means carried by said body, said caging means being selectively actuatable to engage and hold said float in fixed relation to said body;

means for fixedly supporting said bodies of said pair of gyro systems in said vehicle with the planes of said coils of said coils of one gyro system parallel to the planes of the coils of the other gyro system, said coils having a known orientation with respect to said vehicle pitch, yaw and roll axes; and, signal conditioning means responsive to the outputs of said coils, said signal conditioning means including means for providing output signals representing the angular deviation of said vehicle pitch, yaw and roll axes from a set of references axes, said caging means being operable to preset the spin axes of said rotors at a known angular relation with each other and the reference axes.

21. A gyro system comprising:
a body defining a cavity;
a float disposed within said cavity;
means for suspending said float within said cavity to permit complete rotational freedom of said float relative to said body;
gyro rotor means mounted for rotation within said float about a spin axis fixed with respect to said float;
means contained within said float for rotatably driving said rotor; and,
means attached to said body and cooperating with said float for sensing the attitude of said float relative to said body.

22. A gyro system, as defined in claim 21, in which:
said attitude sensing means includes inductor means attached to said body, said rotor including magnet means for inducing a current in said inductor during rotation of said rotor.

23. A gyro system, as defined in claim 21, in which:
said rotor driving means includes a motor powered by electrical cell means.

24. A gyro comprising a float suspended in a fluid completely surrounding said float and contained within a body, said float having complete rotational freedom within said body, said float housing a gyro rotor having a spin axis fixed with respect to said float and means operatively associated with said rotor for driving said rotor, whereby, during rotation of said rotor, said float remains fixed in inertial space with respect to said body, irrespective of the position of said body relative to said float, said gyro further including sensing means attached to said body for sensing the relative orientation of said body and said float.

25. The gyroscope system of claim 1 wherein said driving means comprises:
an electric motor;
a power supply source; and,
circuit means responsive to the rotational speed of said rotor for controlling the amount of electric power supplied by said source to drive said motor and maintain said rotor at a desired rotational speed.

26. The gyroscope system of claim 25 wherein said circuit means comprises:
a sensing coil disposed within said electrical motor for generating a speed signal having an amplitude proportional to the rotational speed of said rotor;
means coupled to said power supply for generating a reference signal having an amplitude indicative of the desired rotational speed;
comparison means for comparing the amplitudes of said speed signal and said reference signal to generate an output signal indicative of the amplitude difference; and,
control means responsive to the output signal for reducing the flow of electrical power from said power supply means to said electric motor as the rotor approaches said desired rotational speed.

27. The gyroscope system of claim 26 wherein:
said electrical motor is a direct current motor including magnetic poles carried by said rotor, a plurality of stator windings disposed within said rotor adjacent said magnetic poles, and an optical commutation system including light source means operated by power from said supply source, photocell circuits responsive to the impingement of light from said light source means for selectively gating electrical power from said power supply means to said stator windings, and an optical shutter means carried by said rotor for energizing said photocell circuits in synchronization with the rotation of said rotor; and,
said control means comprises means for connecting said output signal from said comparison means to vary the application of operating power to said light source means, whereby the light produced by said light source means is reduced as the rotational speed of said rotor approaches said desired speed.

28. A gyroscope system for operation under varying acceleration loads comprising:
a gyro rotor;
a direct current electrical motor for driving said rotor including opposite magnetic poles carried by said rotor and a plurality of stator windings disposed within said rotor adjacent said magnetic poles, and a commutation system for selectively distributing operating power to said stator windings in synchronization with the rotation of said rotor;
a sensing winding disposed adjacent said stator windings for generating a speed signal having an amplitude indicative of the rotational speed of said rotor; and,
control means responsive to said speed signal for reducing the operating power applied to said stator windings as the rotational speed of said rotor approaches a desired speed.

29. The gyroscope system of claim 28 wherein:
said commutation system is an optical system having light source means, photocell circuits responsive to the impingement of light from said light source means for selectively gating electrical power to said stator winding to drive said rotor, an optical shutter means carried for rotation by said rotor for energizing said photocell circuits in synchronization with the rotation of said rotor; and,
control means responsive to said speed signal for reducing operating power supplied to said light source means whereby the light impinging upon said photocell circuits is reduced as said rotor approaches a desired speed.

30. The gyroscope system of claim 28 wherein said control means comprises:
means for establishing a reference signal with an amplitude indicative of the desired rotational speed of the rotor;
a comparison circuit for comparing the amplitudes of said speed signal and said reference signal to produce an output voltage indicative of the amplitude difference; and,
means coupling said output signal to vary the power supplied to said light source means.